United States Patent
Imai et al.

(10) Patent No.: US 9,751,140 B2
(45) Date of Patent: Sep. 5, 2017

(54) CUTTING TOOL AND SPLINE PROCESSING METHOD

(71) Applicant: JTEKT CORPORATION, Osaka-shi, Osaka (JP)

(72) Inventors: Ryousuke Imai, Kashiwara (JP); Eiji Kaneuchi, Kitakatsuragi-gun (JP); Yoshimasa Yamada, Kitakatsuragi-gun (JP); Koichi Nabeshima, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/912,782

(22) PCT Filed: Sep. 1, 2014

(86) PCT No.: PCT/JP2014/072882
§ 371 (c)(1),
(2) Date: Feb. 18, 2016

(87) PCT Pub. No.: WO2015/030229
PCT Pub. Date: Mar. 5, 2015

(65) Prior Publication Data
US 2016/0193675 A1 Jul. 7, 2016

(30) Foreign Application Priority Data
Aug. 30, 2013 (JP) ................................. 2013-178863

(51) Int. Cl.
*B23D 79/12* (2006.01)
*B23D 1/26* (2006.01)
(Continued)

(52) U.S. Cl.
CPC ............... *B23D 79/12* (2013.01); *B23D 1/08* (2013.01); *B23D 1/18* (2013.01); *B23D 1/26* (2013.01);
(Continued)

(58) Field of Classification Search
CPC ... B23D 1/18; B23D 1/26; B23D 1/02; B23D 1/08; B23D 3/02; B23D 13/00
(Continued)

(56) References Cited

U.S. PATENT DOCUMENTS

| | | | | |
|---|---|---|---|---|
| 141,006 A | * | 7/1873 | Larned | B23D 13/00 407/67 |
| 627,099 A | * | 6/1899 | Clugston | B23D 13/005 409/319 |

(Continued)

FOREIGN PATENT DOCUMENTS

| | | | |
|---|---|---|---|
| DE | 3536949 A1 * | 4/1987 | ............... B23D 1/26 |
| JP | H02-70341 A | 3/1990 | |

(Continued)

OTHER PUBLICATIONS

Nov. 25, 2014 International Search Report issued in International Patent Application No. PCT/JP2014/072882.
(Continued)

*Primary Examiner* — Daniel Howell
*Assistant Examiner* — Yasir Diab
(74) *Attorney, Agent, or Firm* — Oliff PLC

(57) ABSTRACT

A cylindrical cutting tool for processing splines formed on an outer circumference of a shaft member to extend in an axial direction includes blade portions which are formed in a spline shape on an inner circumference. The blade portions include: a first blade portion which is formed in a terminal end portion in a first direction along the axial direction and which is directed substantially toward the first direction; and
(Continued)

a second blade portion which is formed in a terminal end portion in a second direction along the axial direction and opposite to the first direction and which is directed substantially toward the second direction.

3 Claims, 7 Drawing Sheets

(51) Int. Cl.
  *B23D 1/08*   (2006.01)
  *B23D 13/00*  (2006.01)
  *B23F 21/06*  (2006.01)
  *B23D 1/18*   (2006.01)
  *B23F 1/04*   (2006.01)

(52) U.S. Cl.
  CPC .............. *B23D 13/005* (2013.01); *B23F 1/04* (2013.01); *B23F 21/06* (2013.01)

(58) Field of Classification Search
  USPC ........ 409/8, 9, 293, 297, 298, 299, 304, 319
  See application file for complete search history.

(56) References Cited

U.S. PATENT DOCUMENTS

| | | | | |
|---|---|---|---|---|
| 1,327,881 | A * | 1/1920 | Roth | B23D 1/18 266/51 |
| 1,466,355 | A * | 8/1923 | Dusenbury | B23D 1/18 409/346 |
| 2,181,810 | A * | 11/1939 | Hawk | C03C 27/06 409/301 |
| 2,466,197 | A | 4/1949 | Berthiez | |
| 3,552,014 | A * | 1/1971 | Persson | B23D 79/08 30/169 |
| 4,672,726 | A * | 6/1987 | Delbecq | B08B 7/024 29/33 A |
| 5,445,050 | A * | 8/1995 | Owens | B24D 15/066 451/392 |
| 6,067,880 | A * | 5/2000 | Arrigoni | A63C 3/10 30/169 |
| 2006/0130309 | A1 | 6/2006 | Keller | |

FOREIGN PATENT DOCUMENTS

| | | |
|---|---|---|
| JP | 04-135104 A | 5/1992 |
| JP | 2002-263951 A | 9/2002 |
| JP | 2011-110680 A | 6/2011 |
| JP | 2012-250322 A | 12/2012 |
| RU | 2 385 786 C1 | 4/2010 |
| SU | 1764874 A1 | 9/1992 |

OTHER PUBLICATIONS

Mar. 3, 2017 Extended European Search Report issued in European Application No. 14840075.7.

* cited by examiner

US 9,751,140 B2

CUTTING TOOL AND SPLINE PROCESSING METHOD

TECHNICAL FIELD

An aspect of the present invention relates to a cutting tool for processing splines in a spline shaft, and a spline processing method in which the cutting tool is used.

BACKGROUND ART

A steering shaft of a steering apparatus of an automobile is requested to have performances of absorbing axial displacement which is caused during travelling, and not transmitting the displacement and vibrations to a steering wheel. Moreover, such a steering shaft is requested to exert a function of axially moving and adjusting the position of the steering wheel so that the driver can attain a position optimum for driving the automobile. In both the cases, the steering shaft is requested to reduce a rattling sound, a rattling feeling of the steering wheel, and the sliding resistance exerted in an axial sliding operation.

A steering shaft is configured by non-rotatably and slidably fitting a male spline shaft on which male splines are formed, and a female spline shaft on which female splines are formed, with each other. In a male spline shaft, conventionally, axial male spline tooth roots are circumferentially placed on the outer circumference of a columnar shaft member, a resin layer having excellent slidability is molded thereon, and male splines are formed. In the formation of the resin layer for the male splines, the resin layer is molded while the thickness is made thicker, and then a predetermined thickness is attained by a cutting process or the like (Patent Document 1).

In the cutting process in the background art, as shown in FIG. 8, a center pin 28 disposed on a front pressing jig 26, and a center pin 29 disposed on a back pressing jig 27 are firstly fitted into centering tapered holes 30, 31 which are disposed at the shaft centers of the end surfaces of a male spline shaft 21, and the male spline shaft 21 is clamped between the front pressing jig 26 and the back pressing jig 27, thereby supporting the male spline shaft 21.

A cutting tool 25 includes blade portions which are formed in a female spline shape on the inner circumference. The blade portions are disposed on one end side in the axial direction, and directed toward the one end side.

The male spline shaft 21 is forwardly moved together with the pressing jigs 26, 27 with respect to the cutting tool 25, and the resin layer which is formed on the male spline shaft 21 in a thicker manner is scratched off by the cutting tool 25, and finished so as to have a predetermined thickness. After the forward movement, the cutting tool 25 is pulled out from the male spline shaft 21.

RELATED ART DOCUMENTS

Patent Documents

Patent Document 1: JP-A-2002-263951

SUMMARY OF THE INVENTION

Problem to be Solved by the Invention

In the above-described cutting process, among various male spline shafts, there is a shaft having a portion which is provided in one end of the shaft and which is larger in maximum work diameter than male splines. In a shaft having such a shape, the cutting tool cannot be pulled out from the shaft after the forward movement. By performing rearward movement, therefore, the cutting tool must be again passed over the portion which has been processed, to be pulled out. In the cutting tool, the blade portions are disposed only on one side in the processing direction. Therefore, the amount of the resin layer which, in the process in the forward movement, is sprung back and not cut in a predetermined manner is scratched. Consequently, the cutting process cannot be applied to a male spline shaft having a portion which is provided in one end of the male spline shaft and which is larger in diameter than male splines.

An aspect of the present invention is proposed in view of the above-described circumstances, and an object thereof is to provide a cutting tool in which, even when a male spline shaft has a portion which is provided in one end of the male spline shaft and which is larger in diameter than male splines, the male splines can be processed by forward and rearward moving the cutting tool, and a spline processing method in which the cutting tool is used. Further, another object is to provide a cutting tool which can accurately process male splines for a male spline shaft which does not have a portion which is provided in one end of the male spline shaft and which is larger in diameter than male splines, and a spline processing method in which the cutting tool is used.

Means for Solving the Problem

A first aspect of the invention provides a cylindrical cutting tool for processing splines formed on an outer circumference of a shaft member to extend in an axial direction, the cutting tool including blade portions which are formed in a spline shape on an inner circumference, wherein the blade portions include: a first blade portion which is formed in a terminal end portion in a first direction along the axial direction and which is directed substantially toward the first direction; and a second blade portion which is formed in a terminal end portion in a second direction along the axial direction and opposite to the first direction and which is directed substantially toward the second direction.

According to the first aspect of the invention, in the cutting tool for processing splines, the first blade portion is formed on the one end side of the cutting tool in the axial direction, and is directed toward the axial direction along which the splines are processed, and the second blade portion is formed on the other end side in the axial direction, and is directed toward the opposite axial direction along which the splines are processed. Therefore, the splines can be processed by forward and rearward movements. In a portion which, in the process in the forward movement, is sprung back and not cut in a predetermined manner, consequently, splines can be accurately finished in the process of the rearward movement.

A second aspect of the invention provides a spline processing method including: placing the terminal end portion of the cutting tool according to the first aspect in the first direction so as to be coaxially with the shaft member and on a side of a starting end portion of the shaft member in the first direction; moving the cutting tool forwardly from the starting end portion in the first direction along the axial direction of the shaft member toward a terminal end portion, thereby performing a spline process on the shaft member by the first blade portion; and moving the cutting tool rearwardly from a side of a starting end portion in the second direction along the axial direction of the shaft member toward a terminal end portion, thereby performing the spline process on the shaft member by the second blade portion.

According to the second aspect of the invention, splines can be processed by, in a state where the shaft member and the cutting tool according to the first aspect are coaxially set, forwardly and rearwardly moving the cutting tool in a first cutting step of forwardly moving the cutting tool from the one end side in the axial direction toward the other end, and performing a spline process by the first blade portions, and a second cutting step of rearwardly moving from the other end side in the axial direction toward the one end, and performing a spline process by second blade portions. Therefore, splines can be accurately processed.

Advantages of the Invention

According to the aspects of the invention, even when the cutting tool is forwardly and rearwardly moved, scratching of the resin layer does not occur. Therefore, it is possible to provide a cutting tool which can process the male splines for a male spline shaft having a portion which is provided in one end of the male spline shaft and which is larger in diameter than male splines, and a spline processing method in which the cutting tool is used. Moreover, it is possible to provide a cutting tool which can accurately process the male splines for a male spline shaft which does not have a portion which is provided in one end of the male spline shaft and which is larger in diameter than male splines, and a spline processing method in which the cutting tool is used.

MODE FOR CARRYING OUT THE INVENTION

Hereinafter, the configuration of a spline process will be described with reference to the figures.

Figure 1:
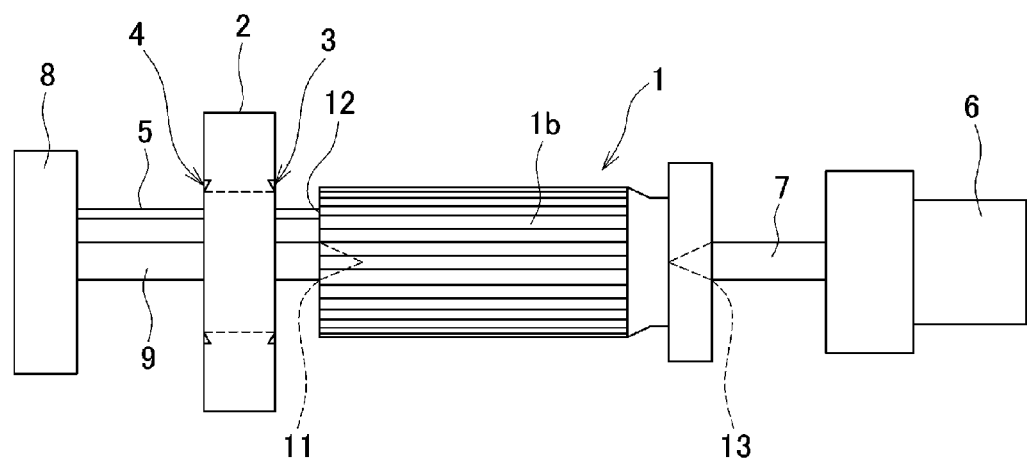
FIG. 1 is a side view showing a cutting work in a spline process in an embodiment of the invention.
Figure 2:
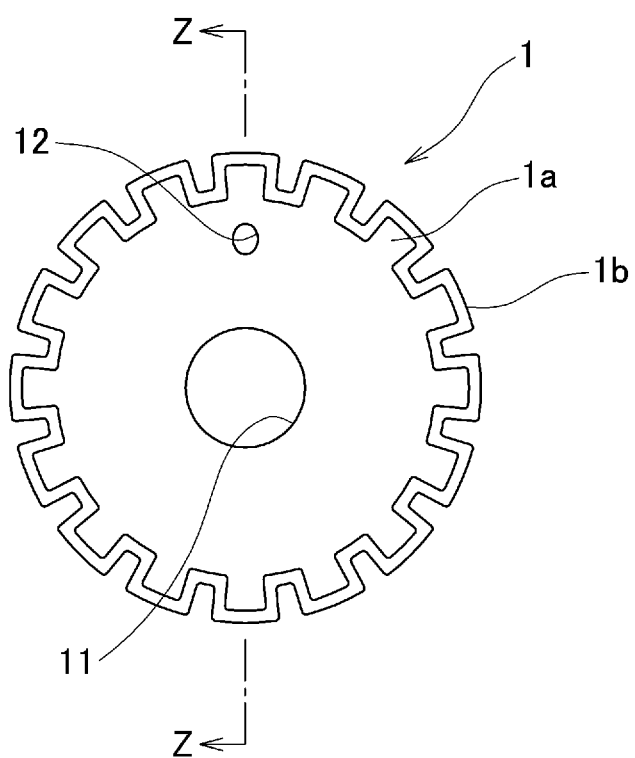
FIG. 2 is a front sectional view showing a male spline shaft on which the spline process in the embodiment of the invention is to be applied.
Figure 3:
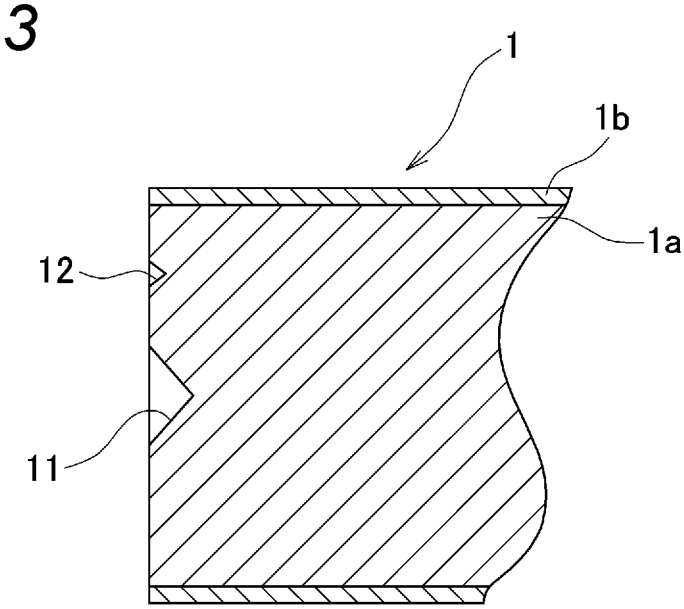
FIG. 3 is a sectional view taken along Z-Z of FIG. 2 in the embodiment of the invention.

FIG. 1 is a side view showing a spline process in an embodiment of the invention, and FIGS. 2 and 3 are front and side sectional views showing a male spline shaft 1 which is used in the spline process.

The male spline shaft 1 will be described with reference to FIGS. 2 and 3.

The male spline shaft 1 is a columnar shaft member which is made of a metal. A plurality of axial male spline tooth roots 1a are circumferentially placed on the outer circumference of the shaft member, and a resin layer 1b is molded thereon to form male splines. The surfaces of the male splines are formed by the resin layer 1b made of a nylon-based resin or the like. Here, the thickness of the resin layer 1b is formed so as to be larger (for example, about 500 μm) than the required thickness (for example, about 100 to 200 μm).

In one end surface of the male spline shaft 1, moreover, a centering tapered hole 11 is formed at the shaft center thereof, and a positioning tapered hole (positioning portion) 12 is formed radially outwardly from the shaft center.

Next, the configuration of a spline processing apparatus will be described with reference to FIG. 1. The spline processing apparatus includes: a front pressing jig 8 which is placed on one axial side of the male spline shaft 1, a back pressing jig 6 which is placed on the other axial side of the male spline shaft 1, and a cutting tool 2 which is to be moved in the axial direction of the male spline shaft 1 to perform the process. The front pressing jig 8 includes a center pin 9 and positioning pin 5 which have a tapered tip end portion, and the back pressing jig 6 includes a center pin 7 which has a tapered tip end portion.

The center pin 9 is fitted into the centering tapered hole 11, and the center pin 7 is fitted into a centering tapered hole 13. According to this, the male spline shaft 1 and the cutting tool 2 are placed coaxially with each other.

Figure 7:
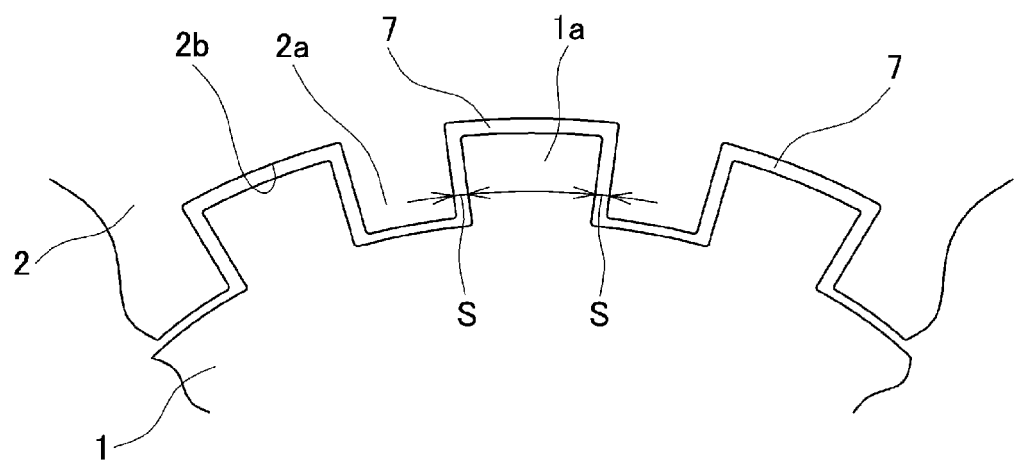
FIG. 7 is a diagram showing positional relationships between teeth of the male spline shaft and blades of the cutting tool in the embodiment of the invention.
Figure 8:
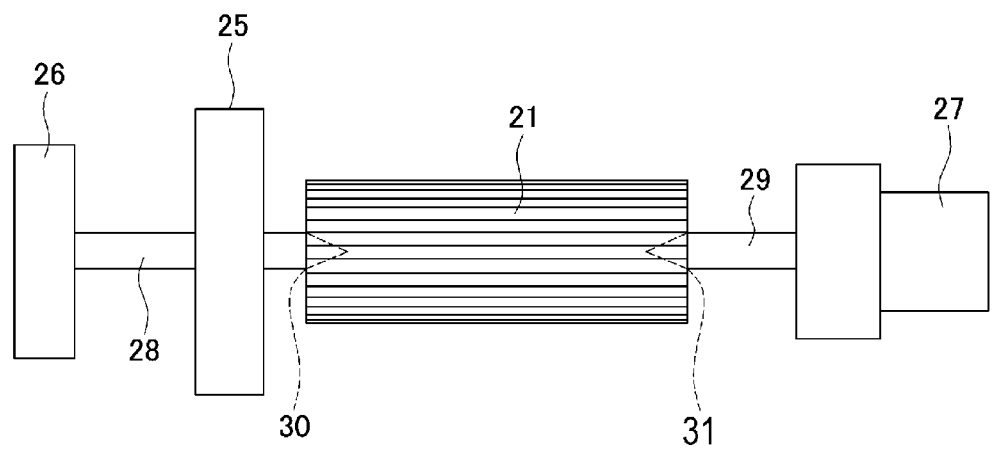
FIG. 8 is a side view showing a cutting process in the background art.

The positioning tapered hole (positioning portion) 12 is fitted to the positioning pin 5, and the circumferential position of the spline shaft 1 with respect to the cutting tool 2 is determined so that, as shown in FIG. 7, the teeth of the male splines are positioned in grooves 2b of the cutting tool 2 which will be described in detail later.

Next, the cutting tool 2 of the embodiment of the invention will be described with reference to FIGS. 4, 5, and 6.

Figure 4:
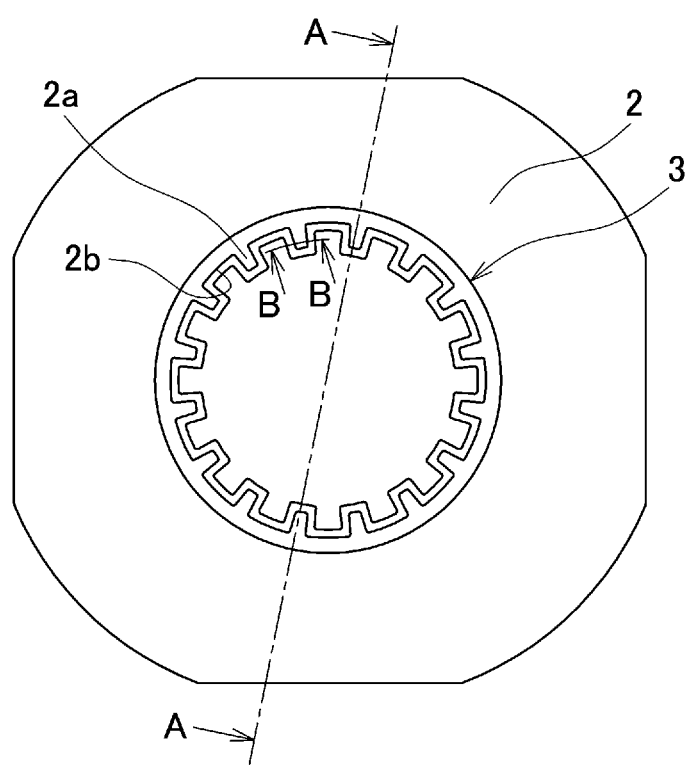
FIG. 4 is a front view of a cutting tool of the embodiment of the invention.
Figure 5:
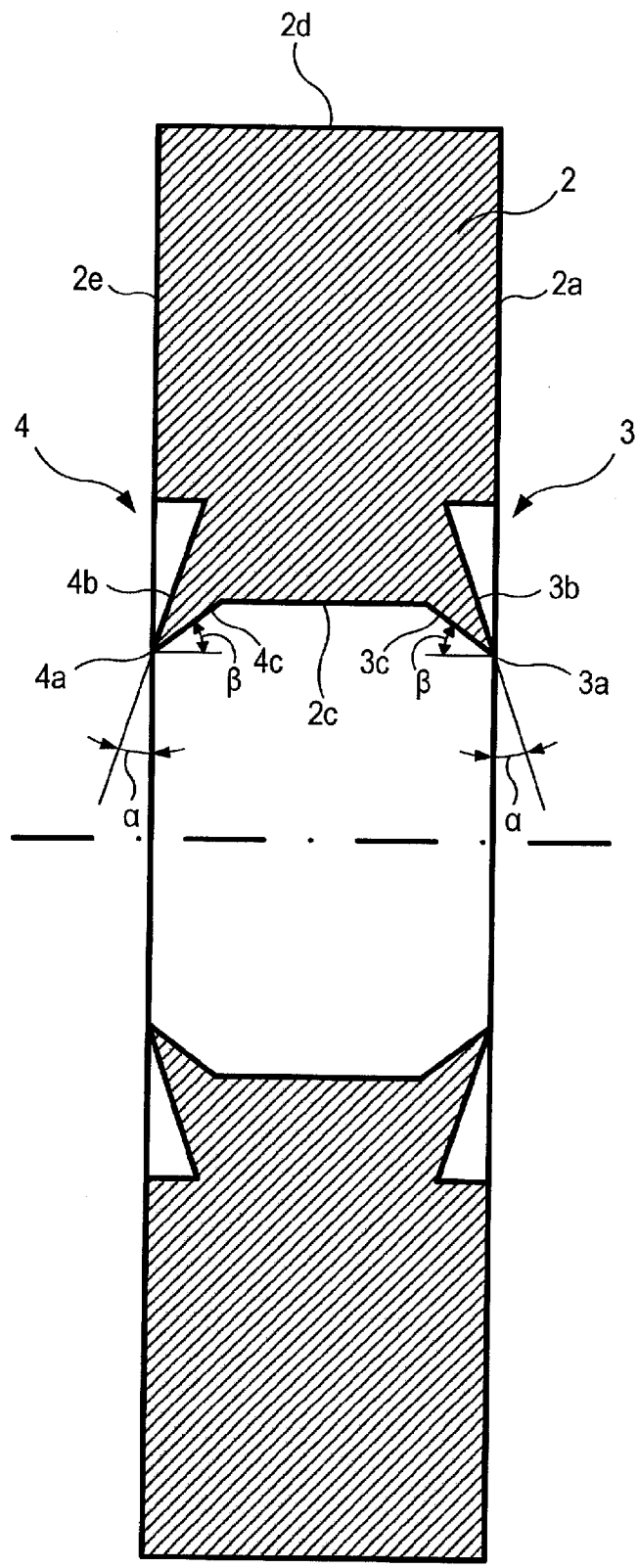
FIG. 5 is a sectional view taken along A-A of FIG. 4 in the embodiment of the invention.
Figure 6:
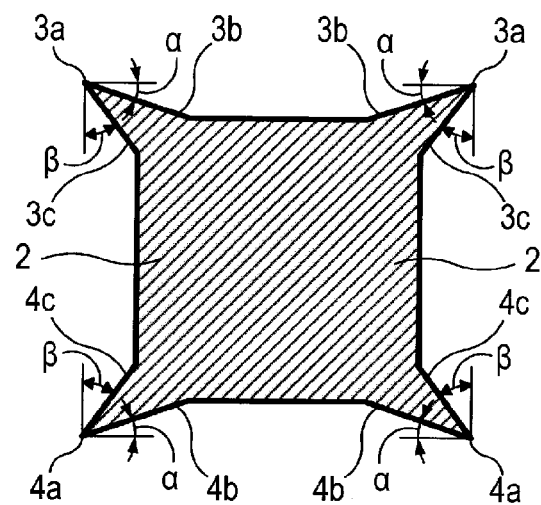
FIG. 6 is a sectional view taken along B-B of FIG. 4 in the embodiment of the invention.

FIG. 4 is a front view showing the cutting tool 2, FIG. 5 is a sectional view of the cutting tool 2 taken along line A-A of FIG. 4, and FIG. 6 is a sectional view of the cutting tool 2 taken along line B-B of FIG. 4.

The cutting tool 2 is formed from a metal material which is suitable for cutting, such as alloy tool steel or high-speed tool steel, into a disk-like shape, and the inner circumference is formed into a spline-like shape. In order to form a spline-like shape, projections 2a which have a trapezoidal sectional shape, and which are projected in the inner radial side are formed on the inner circumference, and a groove 2b having a trapezoidal sectional shape is formed between each pair of projections 2a. The projections 2a and the grooves 2b are disposed at regular intervals in the circumferential direction, and extend in the axial direction.

The cutting tool 2 includes first blade portions 3 and second blade portions 4 in the both ends, i.e., the both ends of the projections 2a and the grooves 2b. The first blade portions 3 are formed on one axial end side of the projections 2a and the grooves 2b (in terminal end portions in a first direction along the shaft portion), while being directed toward approximately the one end (in approximately the first direction), and the second blade portions 4 are formed on the other end side of the projections 2a and the grooves 2b (in terminal end portions in a second direction opposite to the first direction), while being directed toward approximately the other end (in approximately the second direction).

As shown in FIGS. 5 and 6, each of the first blade portions 3 is configured by: a biting portion 3a which is to bite the resin layer 1b; a finishing portion 3b which is to allow shavings of the resin layer 1b to escape; and a relief portion 3c which prevents contact with the resin layer 1b from occurring.

The biting portion 3a is formed in a corner portion on the one end side of the projection 2a and the groove 2b, and has an acute angle.

The finishing portion 3b is formed on the end surface of the one end side of the projection 2a and the groove 2b, and has surfaces which are inclined from the biting portion 3a by an inclination angle α in the outer radial direction or the circumferential direction. In the finishing portion 3b, the inner radial side of the projection 2a, and that of the groove 2b have a surface which is inclined by the inclination angle α in the outer radial direction. In the finishing portion 3b, the portion of the projection 2a on the side of the groove 2b has a surface which is inclined by the inclination angle α in the circumferential direction.

The relief portion 3c is formed on the side surfaces of the projection 2a and the groove 2b, and has a surface which is inclined from the biting portion 3a by an inclination angle β in the axial direction.

Each of the second blade portions 4 is configured by: a biting portion 4a which is to bite the resin layer 1b; a finishing portion 4b which is to allow shavings of the resin layer 1b to escape; and a relief portion 4c which prevents contact with the resin layer 1b from occurring.

The biting portion 4a is formed in a corner portion on the other end side of the projection 2a and the groove 2b, and has an acute angle.

The finishing portion 4b is formed on the end surface of the other end side of the projection 2a and the groove 2b, and has surfaces which are inclined from the biting portion 4a by the inclination angle α in the outer radial direction or the circumferential direction. In the finishing portion 4b, the inner radial side of the projection 2a, and that of the groove 2b have a surface which is inclined by the inclination angle α in the outer radial direction. In the finishing portion 4b, the portion of the projection 2a on the side of the groove 2b has a surface which is inclined by an inclination angle α in the circumferential direction.

The relief portion 4c is formed on the side surfaces of the projection 2a and the groove 2b, and has a surface which is inclined from the biting portion 4a by the inclination angle β in the axial direction.

Next, the spline process in which the spline processing apparatus shown in FIG. 1 and including the cutting tool is used will be described.

The male spline shaft 1 is placed between the front pressing jig 8 and the back pressing jig 6, the center pin 9 of the front pressing jig 8 is fitted into the centering tapered hole 11, the center pin 7 of the back pressing jig 6 is fitted into the centering tapered hole 13, and the male spline shaft 1 and the cutting tool 2 are placed coaxially with each other.

The positioning pin 5 is fitted into the positioning tapered hole (positioning portion) 12, and the circumferential position of the male spline shaft 1 with respect to the cutting tool 2 is determined so that the spline tooth roots 1a of the male spline shaft 1 are located in the grooves 2b of the cutting tool 2.

Next, the male spline shaft 1 is moved together with the front pressing jig 8 and the back pressing jig 6 toward the cutting tool 2 in the axial direction, and the male spline shaft 1 is passed into the cutting tool 2.

In a first cutting step of causing the biting portions 3a of the first blade portions 3 to bite the resin layer 1b of the male spline shaft 1, and forwardly moving the cutting tool from the starting end side in the cutting processing direction along the axial direction of the male spline shaft 1, toward the terminal end side in the cutting processing direction (from the starting end side in the first direction toward the terminal end side), a part of the resin layer 1b is removed away to process the male splines.

Thereafter, in a second cutting step of causing the biting portions 4a of the second blade portions 4 to bite the resin layer 1b of the male spline shaft 1, and rearwardly moving the cutting tool from the terminal end side in the cutting processing direction toward the starting end side in the cutting processing direction (from the starting end side in the second direction toward the terminal end side), a part of the resin layer 1b is removed away to perform a finishing process on the male splines. An amount which, in the forward movement of the first cutting step, is sprung back and not cut is removed in the forward movement, and therefore the male splines can be accurately finished. Even when, in the male spline shaft 1, there is a portion that is larger in diameter than the male splines, the resin layer 1b is prevented from being scratched in the rearward movement, and the male splines can be processed.

Finally, the male spline shaft 1 is detached from the front pressing jig 8 and the back pressing jig 6, and the spline process is completed.

The invention is not limited at all to the embodiment, and may be implemented by modifying in various manners without departing from the spirit of the invention.

In the above-described embodiment, the first blade portions 3 and the second blade portions 4 have the same shape and dimensions. In another embodiment, the first blade portions 3 and the second blade portions 4 may have different shapes and dimensions. For example, the portions may be different from each other in degree of the inclination angle α in the circumferential direction, and the inclination angle β in the axial direction. When the angles are well adjusted, the male splines may be more accurately finished.

The application is based on Japanese Patent Application (No. 2013-178863) filed Aug. 30, 2013, and its disclosure is incorporated herein by reference.

DESCRIPTION OF REFERENCE SIGNS

1 . . . Male Spline Shaft, 1a . . . Spline Tooth Root, 1b . . . Resin Layer, 2 . . . Cutting Tool, 3 . . . First Blade Portion, 4 . . . Second Blade Portion, 5 . . . Positioning Pin, 6 . . . Back Pressing Jig, 8 . . . Front Pressing Jig, 7, 9 . . . Center Pin, 12 . . . Positioning Tapered Hole, 11, 13 . . . Centering Tapered Hole

The invention claimed is:

1. A cylindrical cutting tool for processing splines formed on an outer circumference of a shaft member to extend in an axial direction, said cutting tool comprising:
blade portions which are formed in a spline shape on an inner circumference,
wherein each of the blade portions comprises:
a first blade portion which is formed in a first terminal end portion in a first direction along the axial direction and which is directed substantially toward the first direction;
a second blade portion which is formed in a second terminal end portion in a second direction along the axial direction and opposite to the first direction and which is directed substantially toward the second direction; and
a relief portion between an edge of the first blade portion and an edge of the second blade portion in the axial direction, the relief portion being radially outward relative to the first blade portion and the second blade portion.

2. A spline processing method comprising:
placing the first terminal end portion of the cutting tool according to claim 1 in the first direction so as to be coaxially with the shaft member and on a side of a starting end portion of the shaft member in the first direction;
moving the cutting tool forwardly from the starting end portion in the first direction along the axial direction of the shaft member toward the first terminal end portion, thereby performing a spline process on the shaft member by the first blade portion; and
moving the cutting tool rearwardly from a side of a starting end portion in the second direction along the axial direction of the shaft member toward the second terminal end portion, thereby performing the spline process on the shaft member by the second blade portion.

3. The cylindrical cutting tool according to claim 1, wherein:
the first terminal end portion has a first radially-extending end surface, the first blade portion including a first finishing portion having a first wall inclined at an angle relative to the first end surface; and
the second terminal end portion has a second radially-extending end surface, the second blade portion including a second finishing portion having a second wall inclined at an angle relative to the second end surface.

* * * * *